US005883624A

United States Patent [19]

Teramura et al.

[11] Patent Number: 5,883,624

[45] Date of Patent: Mar. 16, 1999

[54] DOCUMENT REFERENCE APPARATUS AND METHOD FOR DISPLAYING DOCUMENTS PAGE BY PAGE AND STORAGE MEDIUM STORING PROGRAM USED FOR REALIZING THE APPARATUS AND METHOD

[75] Inventors: Kanako Teramura, Ashiya; Hiroyuki Sasaki, Ibaraki; Hassan Toorabally, Ashiya, all of Japan

[73] Assignee: Matsushita Electric Industrial Co., Ltd., Kadoma, Japan

[21] Appl. No.: 639,269

[22] Filed: Apr. 24, 1996

[30] Foreign Application Priority Data

| | | | |
|---|---|---|---|
| Apr. 25, 1995 | [JP] | Japan | 7-099177 |
| Jun. 9, 1995 | [JP] | Japan | 7-151863 |

[51] Int. Cl.$^{6}$ ..... G06F 15/00

[52] U.S. Cl. ..... 345/339

[58] Field of Search ..... 345/441, 115, 345/116, 121, 333, 336, 339, 356, 357

[56] References Cited

U.S. PATENT DOCUMENTS

| | | | |
|---|---|---|---|
| 5,408,655 | 4/1995 | Oren et al. | 395/600 |
| 5,495,602 | 2/1996 | Harada et al. | 395/600 |
| 5,539,869 | 7/1996 | Spoto et al. | 395/154 |
| 5,657,462 | 8/1997 | Brouwer et al. | 395/336 |

*Primary Examiner*—Phu K. Nguyen
*Attorney, Agent, or Firm*—Price, Gess & Ubell

[57] ABSTRACT

A document reference apparatus and method and a storage medium storing the program used for realizing the apparatus and method are provided for displaying documents page by page for helping a user to search for a desired document. The apparatus stores documents in a storage unit. On receiving a reference start instruction, the apparatus reads documents from the storage unit, then converts the document information into the one which provides less processing in generating display images. Then, the apparatus generates the display images for each page and displays them on the screen in sequence.

13 Claims, 21 Drawing Sheets

Fig. 13

| | | | |
|---|---|---|---|
| 41 | feature point coordinate information | delete low-order bits | 1201 |
| 401 | line type | solid line | 1202 |
| 402 | line thickness | 1 dot | 1203 |
| 403 | pattern | white,no pattern → no pattern<br>black → black<br>others → shading | 1204 |

401, 402, 403: graphic image attribute information 42

Merry Christmas!!!

Come to our Christmas party.

Please bring a gift.

Fig. 17B

DOCUMENT REFERENCE APPARATUS AND METHOD FOR DISPLAYING DOCUMENTS PAGE BY PAGE AND STORAGE MEDIUM STORING PROGRAM USED FOR REALIZING THE APPARATUS AND METHOD

BACKGROUND OF THE INVENTION (1). Field of the Invention

This invention relates to a document reference apparatus and method for storing codes or images of documents and for displaying the documents page by page, and relates to a storage medium storing a program used for realizing the apparatus and method.

(2). Description of the Prior Art

Recently, document reference apparatuses have been brought onto the market. Users can make documents using a word-processor and store them in floppy disks. Also, users can read and store images in magnet-optical disks using a scanner. The document reference apparatuses read the codes and images of the documents stored in such auxiliary storages and display the documents on the screen so that users can search for a desired document on the screen.

One of such conventional techniques, Japanese Laid-Open Patent Application No.61-193265, discloses a method for allowing an operator to find a desired document on the screen. In the method, contents of documents are displayed page by page in sequence on the screen according to instructions from the operator such as "forward," "backward," "fast forward," "fast backward," or "pause."

An apparatus of the conventional method, as shown in FIG. 1, comprises document storage unit 2101, reference instruction receiving unit 2102, reading unit 2103, image generating unit 2104, and displaying unit 2109. Document storage unit 2101 stores groups of characters, graphic images, bit map images, end the like which make up documents, and also stores attributes of the characters and images. Reference instruction receiving unit 2102 receives instructions input by the operator such as "page reference start," "stop," and those specifying reference conditions. Reading unit 2103 reads reference target documents from document storage unit 2101 according to instructions output from reference instruction receiving unit 2102. Image generating unit 2104 generates display images of the documents read by reading unit 2103. Displaying unit 2105 displays the images generated by image generating unit 2104.

The conventional document reference apparatus operates as shown below. Reference instruction receiving unit 2102 receives instructions input by the operator such as "page reference start," "stop," and those specifying reference conditions, and sends the instructions to reading unit 2103. on receiving "page reference start" instruction and instructions specifying conditions, reading unit 2103 reads reference target documents that meet the conditions from document storage unit 2101 in sequence. On receiving the documents from reading unit 2103, image generating unit 2104 generates display images of the documents. Displaying unit 2105 displays the images of the documents on the screen. The operator searches a desired document watching the display.

Meanwhile, the conventional technique generates the display images based on the character codes, graphic image information, bit map images, attributes, etc. Accordingly, if some attributes are attached to the character codes or the graphic image information, various conversion processes are required. This takes a lot of time in generating the display images. Also, calculations for coordinate values are necessary to generate display images from the graphic image information. If a large number of digits are used in the coordinates, generating the display image takes a lot of time. The same for generating display images from the bit map images since they include a large amount of data. In this way, taking a lot of time for generating display images is a problem of the conventional technique. This makes it difficult for the apparatus to perform a high-speed page forward.

SUMMARY OF THE INVENTION

Therefore, an object of the present invention is to provide a document reference method for displaying documents page by page at high speed even when stored documents specify attributes.

Another object of the present invention is to provide a document reference apparatus suitable for the method.

Still another object of the present invention is to provide a storage medium storing a program used to realize the method.

One of the above objects is fulfilled by a document reference apparatus for displaying documents page by page for helping a user to search for a desired document, comprising: a document storage unit for storing a plurality of documents to be referred to; an instruction receiving unit for receiving a reference start instruction, a reference end instruction, and a reference range instruction input by the user; a reading unit for sequentially reading documents which are in a range specified by the reference range instruction from the document storage unit; a document information converting unit for converting document information of each read document into the same which provides less processing in generating display images; an image generating unit for generating a display image of each page of the read documents using the converted document information; and a displaying unit for displaying generated display images in sequence.

With such construction, the document information converting unit converts the document information to the one which provides less processing in generating display images. Therefore, display images are generated at high speed and documents are displayed page by page at high speed.

In the document reference apparatus, each of the documents stored in the document storage unit may include at least a character and the character includes a character code and character attribute information, and the document information converting unit may comprise: a character data identifying unit for identifying character codes and character attribute information of characters of the read documents; and a character data converting unit for converting character attribute information into the same which provides less processing in generating display images, and for sending character codes to the image generating unit without converting the character codes, wherein the image generating unit generates display images of the documents using the character codes and the converted character attribute information.

With such construction, the character data converting unit converts the character attribute information to the one which provides less processing, and does not convert information of character codes and the like which are important for document reference. Therefore, display images are generated at high speed and documents are displayed page by page at high speed even when stored documents specify attributes and the like.

In the document reference apparatus, some of the documents stored in the document storage unit may include one or more graphic images and each of the graphic images includes feature point coordinates, and the document information converting unit may comprise: a feature point coordinate deleting unit for rounding off the feature point coordinates of documents read by the reading unit, wherein the image generating unit calculates coordinates using the rounded-off feature point coordinates and generates display images based on the coordinates obtained by the calculation.

With such construction, the feature point coordinate deleting unit rounds off the feature point coordinates. Therefore, display images are generated at high speed with feature point coordinates with less digits, and documents are displayed page by page at high speed.

In the document reference apparatus, each of the graphic images may include feature point coordinates and graphic image attribute information, and the document information converting unit may further comprise: a graphic image attribute information converting unit for converting the graphic image attribute information into the same which provides less processing in generating display images, wherein the image generating unit generates display images of the documents using the rounded-off feature point coordinates and converted graphic image attribute information.

With such construction, the graphic image attribute information converting unit converts the graphic image attribute information to the one which provides less processing. Therefore, display images are generated at high speed and documents are displayed page by page at high speed even when stored documents specify attributes and the like.

In the document reference apparatus, some of the documents stored in the document storage unit may include one or more bit map images and each of the bit map images includes an image and occupied area information which specifies an area occupied by the image, and the document information converting unit may comprise: an image replacing unit for replacing each image in bit map images of the read documents by a certain shape with a certain pattern, wherein the image generating unit generates display images based on the occupied area information and the certain shape with the certain pattern.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 13 shows a conversion table used by graphic image attribute converting unit 106.

FIGS. 17A and 17B show how character rows are converted.

DESCRIPTION OF THE PREFERRED EMBODIMENT

<First Embodiment>

Figure 1:
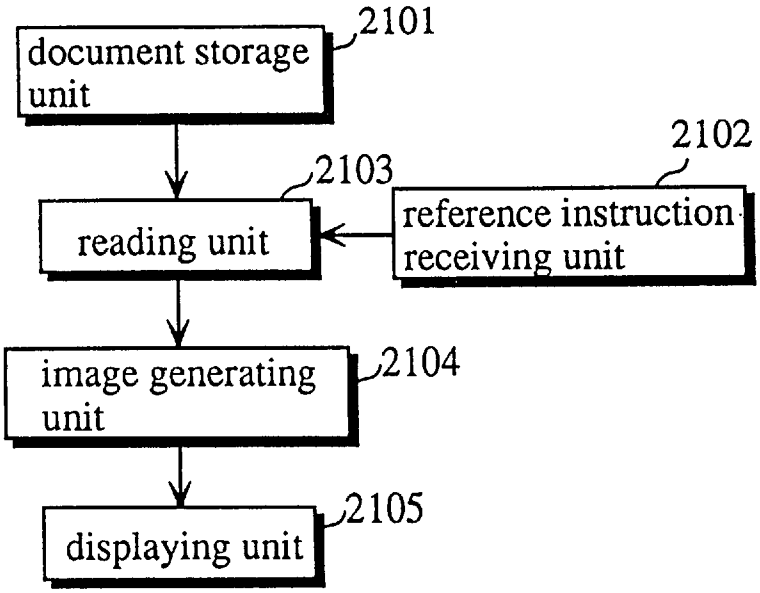
Fig.1 PRIOR ART
FIG. 1 is a block diagram showing the construction of a conventional document reference apparatus.
Figure 2:
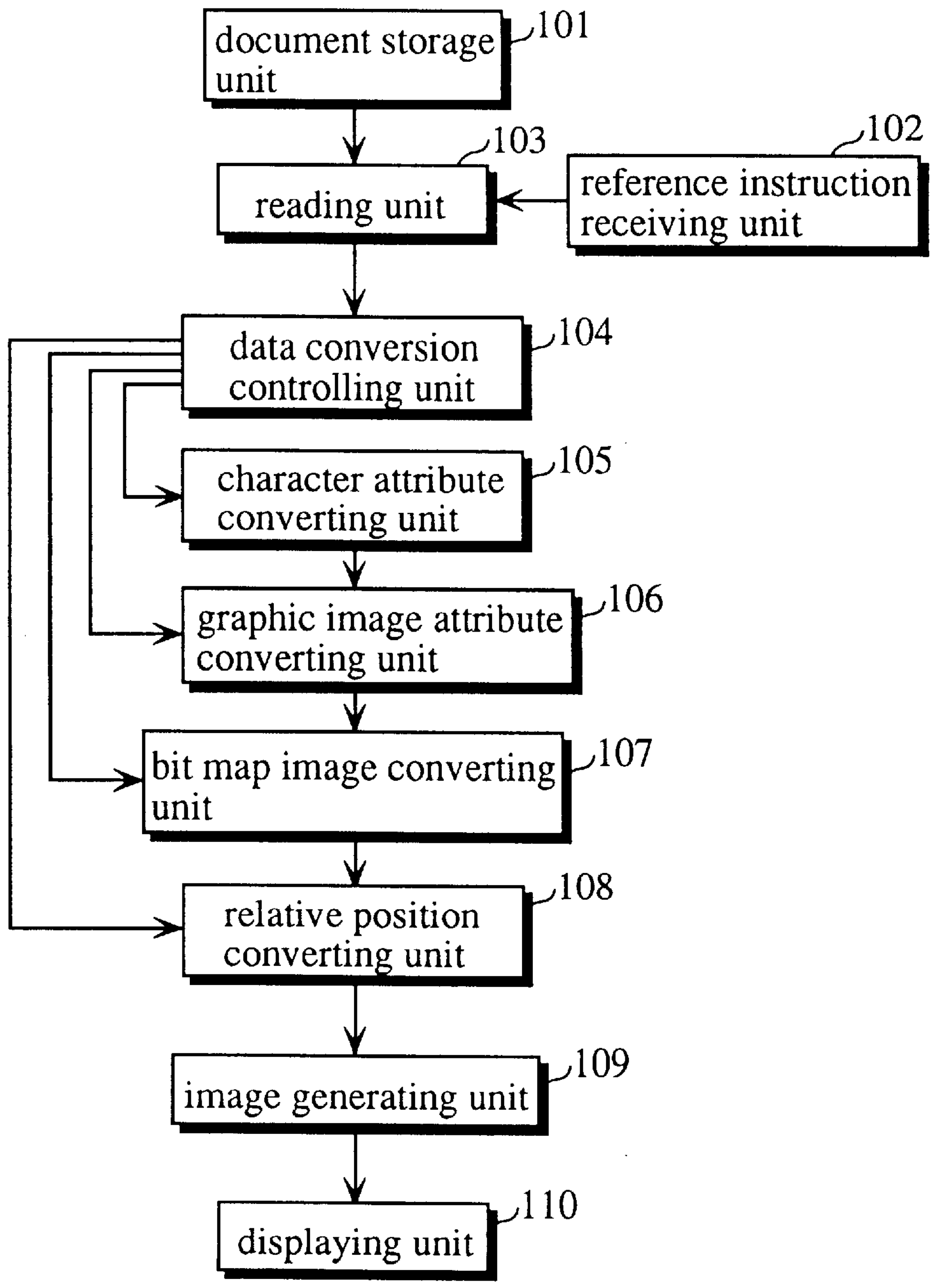
FIG. 2 is a block diagram showing the construction of the document reference apparatus of the present invention in First Embodiment.

FIG. 2 is a block diagram showing the construction of the document reference apparatus in First Embodiment of the present invention. The document reference apparatus comprises document storage unit 101, reference instruction receiving unit 102, reading unit 103, data conversion controlling unit 104, character attribute converting unit 105, graphic image attribute converting unit 106, bit map image converting unit 107, relative position converting unit 108, image generating unit 109, end displaying unit 110.

Figure 3:
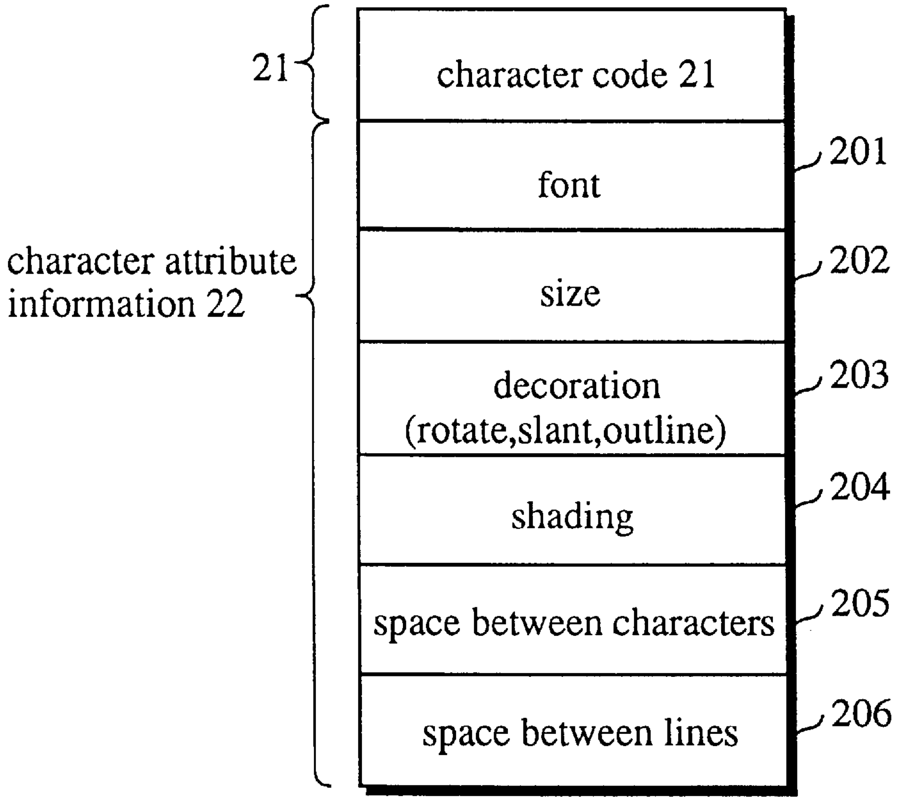
FIG. 3 shows the format of the characters stored in document storage unit 101.

Document storage unit 101 stores documents. A document may include characters, graphic images, bit map images, etc. A character stored in document storage unit 101 includes character code 21 and character attribute information 22 which specifies display attribute of a character specified by character code 21, as shown in FIG. 3. The character attribute information 22 includes font 201, size 202, decoration 203, shading 204, space between characters 205, space between lines 206, etc.

Font 201 can specify any of Courier, sans serif, roman, etc. Size 202 can specify a character size, e.g., 10×10 dots, 10×20 dots, 20×10 dots, 20×20 dots, etc. Decoration 203 can specify any of rotate, slant, outline, etc. Shading 204 can specify a type and a range of shading. Space between characters 205 can specify a length between characters. Space between lines 205 can specify a length between lines.

Document storage unit 101 also stores the start position information and document format information of the character row blocks. The start position information of a character row block specifies the start position by a line number and a column number of a page. The document format information specifies the writing direction, paper size, paper direction, margins, etc.

Figure 4:
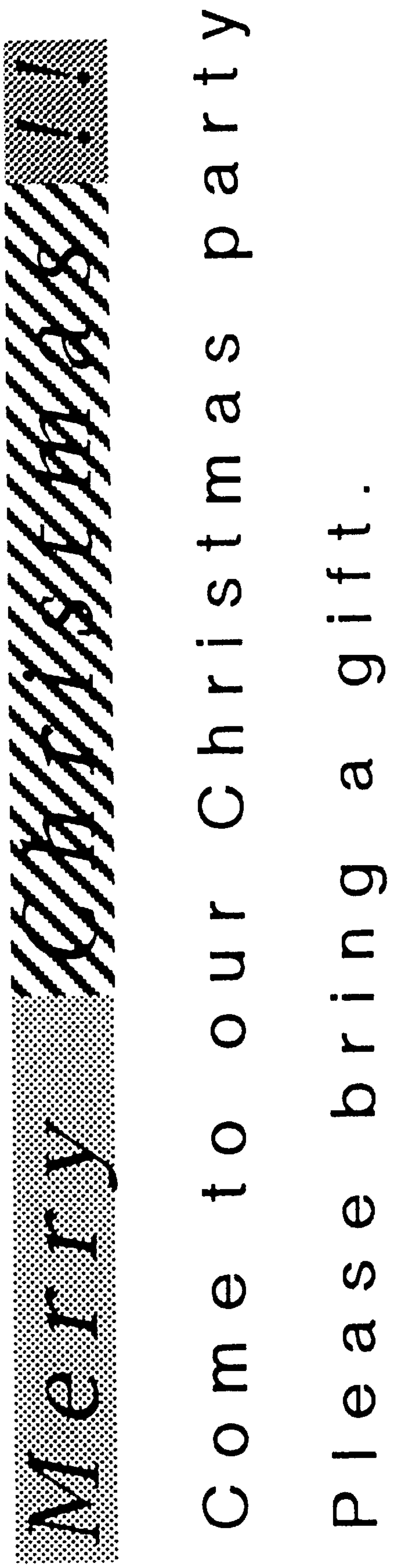
FIG. 4 shows a display image of character rows stored in document storage unit 101.

FIG. 4 shows character rows stored in document storage unit 101. The first line in the figure is 20×20 dots in size, slanted, and have some types of shading on it, The second and third lines are both 10×10 dots in size and use a sans serif font.

Figure 5:
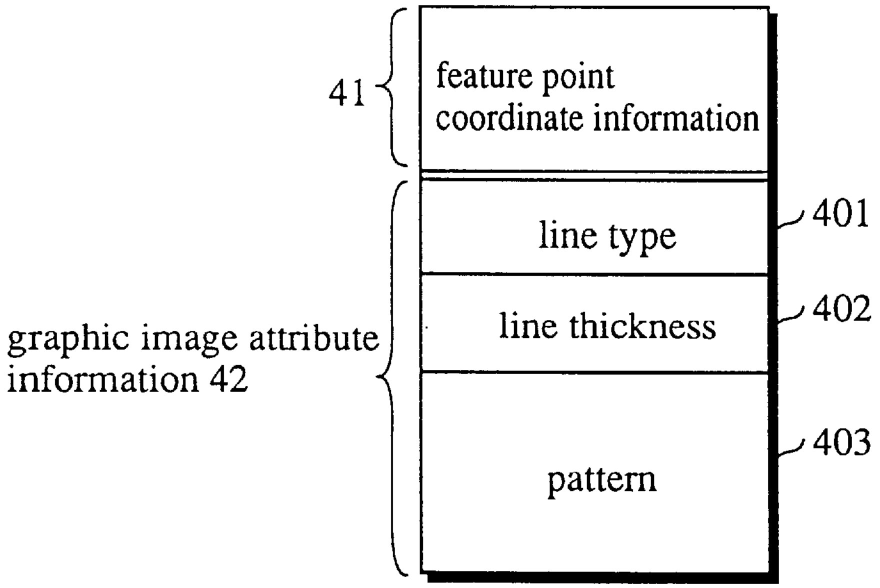
FIG. 5 shows the format of the graphic images stored in document storage unit 101.
Figure 6:
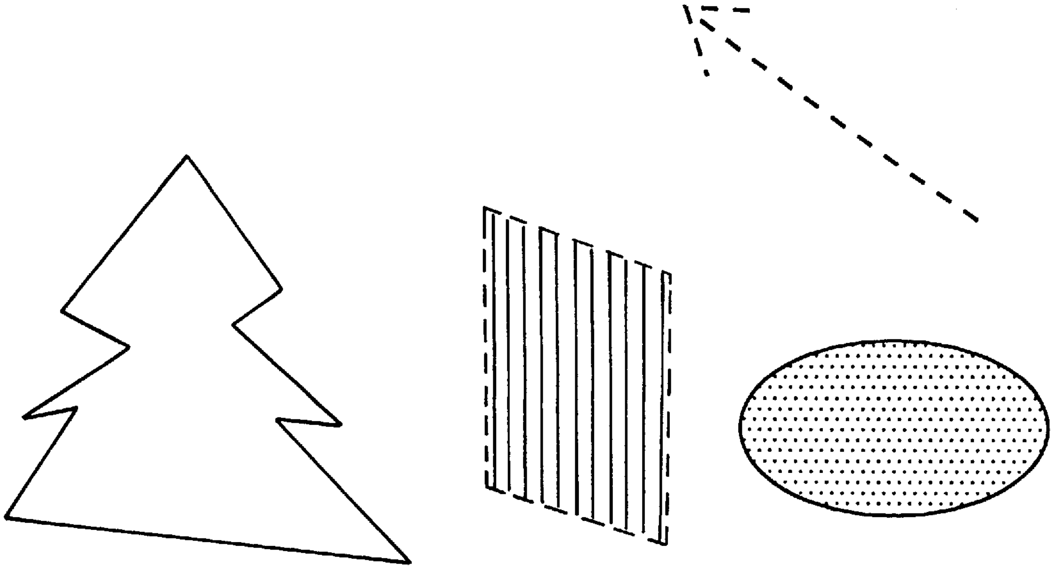
FIG. 6 shows display images of graphic images stored in document storage unit 101.

Document storage unit 101 stores information of each graphic image including feature point coordinate information 41, graphic image attribute information 42, etc., as shown in FIG. 5.

Feature point coordinate information 41 includes the number of vertices showing the shape of a graphic image and the coordinates of the vertices. For example, each vertex of a polygon or a point on the circumference of a circle is a feature point, and its coordinates are called feature point coordinates. The feature point coordinates may also provide information on a position in a square, e.g. the center of the square, a corner of the square, etc., made by a line number and a column number of a page. The feature point coordinates may be represented by dot coordinates or millimeter coordinates of a document.

Graphic image attribute information 42 has information of attributes of a graphic image such as line type 401, line thickness 402, pattern 403, etc. Line type 401 can specify any of a solid line, a dotted line, etc. Line thickness 402 can specify any of 1 dot, 2 dots, 3 dots, etc. Pattern 403 can specify a pattern of a graphic image such as vertical stripe, horizontal stripe, crosshatching, slant stripe, gray, black, white, etc.

Figure 7:
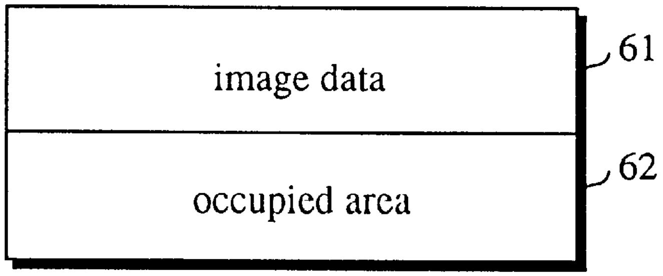
FIG. 7 shows the format of the bit map images stored in document storage unit 101.
Figure 8:
FIG. 8 shows a display image of a bit map image stored in document storage unit 101.

A bit map image stored in document storage unit 101 includes image data 61, occupied area 62, etc., as shown in FIG. 7. Image data 61 is image data of the bit map image. FIG. 8 shows an example of a bit map image stored in document storage unit 101. Generally, bit map images are compressed before they are stored in document storage unit 101. Occupied area 62 has information of an area in a document occupied by the bit map image. The occupied area is represented by coordinates of the vertices. Note that image data 61 may be stored in an independent file. Also note that each block of the documents stored in document storage unit 101 hat header information which specifies a type of the block, e.g. character row, graphic image, bit map image, etc.

Reference instruction receiving unit 102 receives an operational instruction from an operator. The operational instruction is a reference start instruction, a reference end instruction, a reference range specification instruction, etc. The reference start instruction instructs the document reference apparatus to display the documents stored in document storage unit 101 in sequence page by page on the screen. The reference end instruction is used to end the sequential display when a target document is found. There may be an instruction for displaying the preceding page and the succeeding page as well as the current page. The reference range specification instruction specifies the range of documents to be displayed for reference.

Reading unit 103 reads the documents stored in document storage unit 101 in sequence after reference instruction receiving unit 102 receives a reference start instruction until it receives a reference end instruction.

Data conversion controlling unit 104 fetches the first page of a document read by reading unit 103. Then data conversion controlling unit 104 fetches character row blocks, graphic image blocks, bit map image blocks of the page in sequence, and activates character attribute converting unit 105, graphic image attribute converting unit 106, bit map image converting unit 107, relative position converting unit 108, and image generating unit 109 to generate a display image of the page. Data conversion controlling unit 104 identifies the types of the blocks when fetching them based on the header information. Also, data conversion controlling unit 104 activates displaying unit 110 to display a generated display image on the screen. Note that data conversion controlling unit 104 may fetch any page other than the first page, or fetch a plurality of pages.

Figure 11:
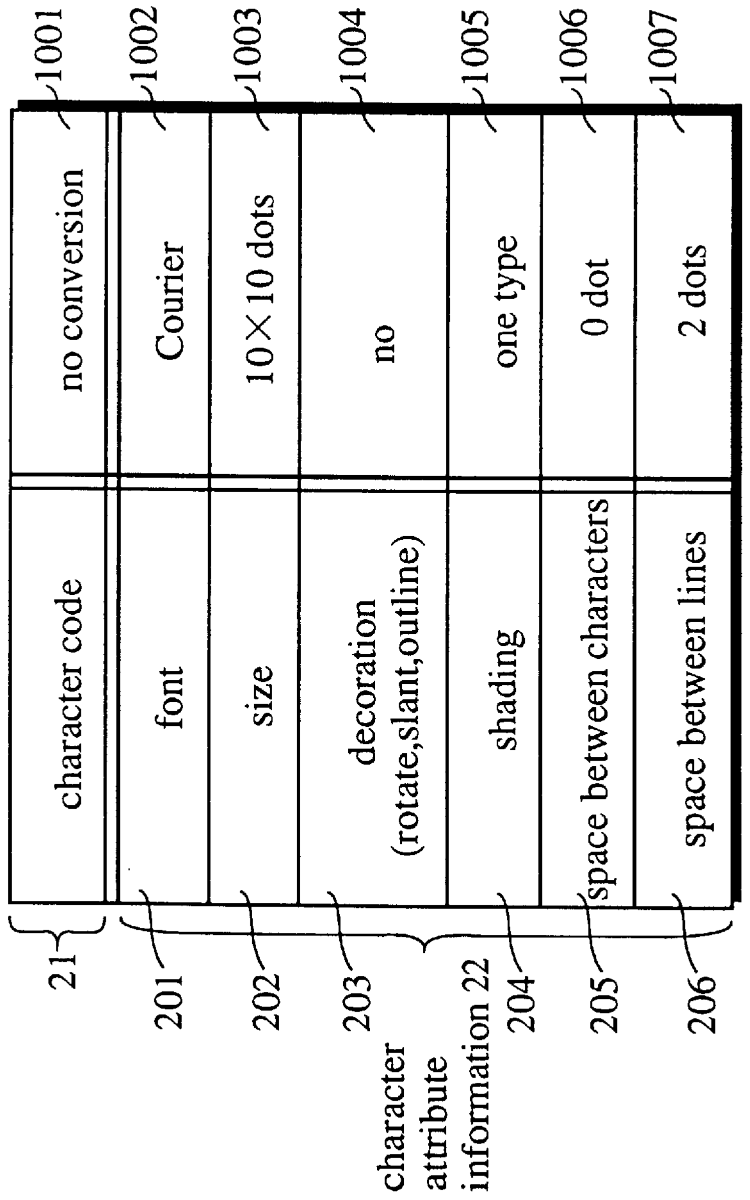
FIG. 11 shows a conversion table used by character attribute converting unit 105.

Character attribute converting unit 105 changes character attribute information 22 of a character row block fetched by data conversion controlling unit 104 according to a table shown in FIG. 11 to simplify and unify the character row block. Accordingly, the table shown in FIG. 11 contains information necessary for the operator to find a desired document. Character code 21 specifies "no change" as shown in 1001 because the character codes are important in searching a desired document. A type is specified for each of font 201 and size 202 as shown in 1002 and 1003. No decoration is specified in decoration 203 as shown in 1004. A type is specified in shading 204 as shown in 1005. "0 dot" is specified for space between characters 205 as shown in 1006, and "2 dots", for space between lines 206.

Graphic image attribute converting unit 106 changes feature point coordinate information 41 and graphic image attribute information 42 of a graphic image block fetched by data conversion controlling unit 104 according to a table shown in FIG. 13 to simplify and unify the graphic image block. Graphic image attribute converting unit 106 deletes two low-order bits from feature point coordinate information 41. In the table of FIG. 13, a solid line is specified for line type 401 as shown in 1202, and "1 dot" for line thickness 402 as shown in 1203. As for pattern 403, "white" is converted to "no pattern." "No pattern," "black," or "shading" remains to be the same. Others such as "vertical stripe," "horizontal stripe," "slant stripe," and "crosshatching" are converted to "shading."

Figure 16A:
FIGS. 16A and 16B show how a bit map image is converted.
Figure 16B:
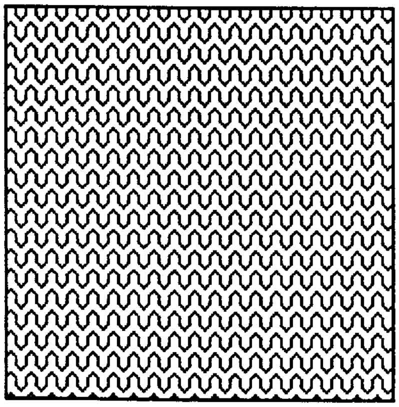

Bit zap image converting unit 107 changes information of a bit map image block fetched by data conversion controlling unit 104 according to a predetermined method. Specifically, bit map image converting unit 107 deletes image data 61, specifies a predetermined line type, line thickness, and pattern for occupied area 62 which is to be displayed at the place of the bit map image. The specified data is regarded as data of a graphic image. Then, bit map image converting unit 107 simplifies the coordinates of the area. As a result, for example, a bit map image shown in FIG. 16A is replaced by the occupied area as shown in FIG. 16B.

Bit map image converting unit 107 may specify a special pattern for displaying the area or specify that characters "BIT MAP IMAGE" are displayed in the area so that the operator does not mistake it for a graphic image.

Relative position converting unit 108 deletes the display position attribute information of each of the character rows, graphic images, bit map images and the like of the input document, where the display position attribute information is any of justification, centering, indent, etc.

Image generating unit 109 generates the display image data by combining data of a document converted by character attribute converting unit 105, graphic image attribute converting unit 106, bit map image converting unit 107, and relative position converting unit 108.

Displaying unit 110 displays the document on the screen by using the display image data generated by image generating unit 109.

Now, the operation of the document reference apparatus is described with reference to the flowchart shown in FIGS. 9 and 10.

Reference instruction receiving unit 102 waits for a reference start instruction input by the operator (step S101). After the operator enters a reference start instruction and reading unit 103 reads a document (stop S102), data conversion controlling unit 104 determines the display area by obtaining the coordinate values based on the paper sizer margins, etc. Relative position converting unit 108 deletes the display position attribute information from the document (step S103). Then, data conversion controlling unit 104 fetches the fist block of the read document (step S104). Data conversion controlling unit 104 judges whether the fetched block is a character row block (step S105). If it is, character attribute converting unit 105 performs the character attribute conversion (step S106).

Figure 12:
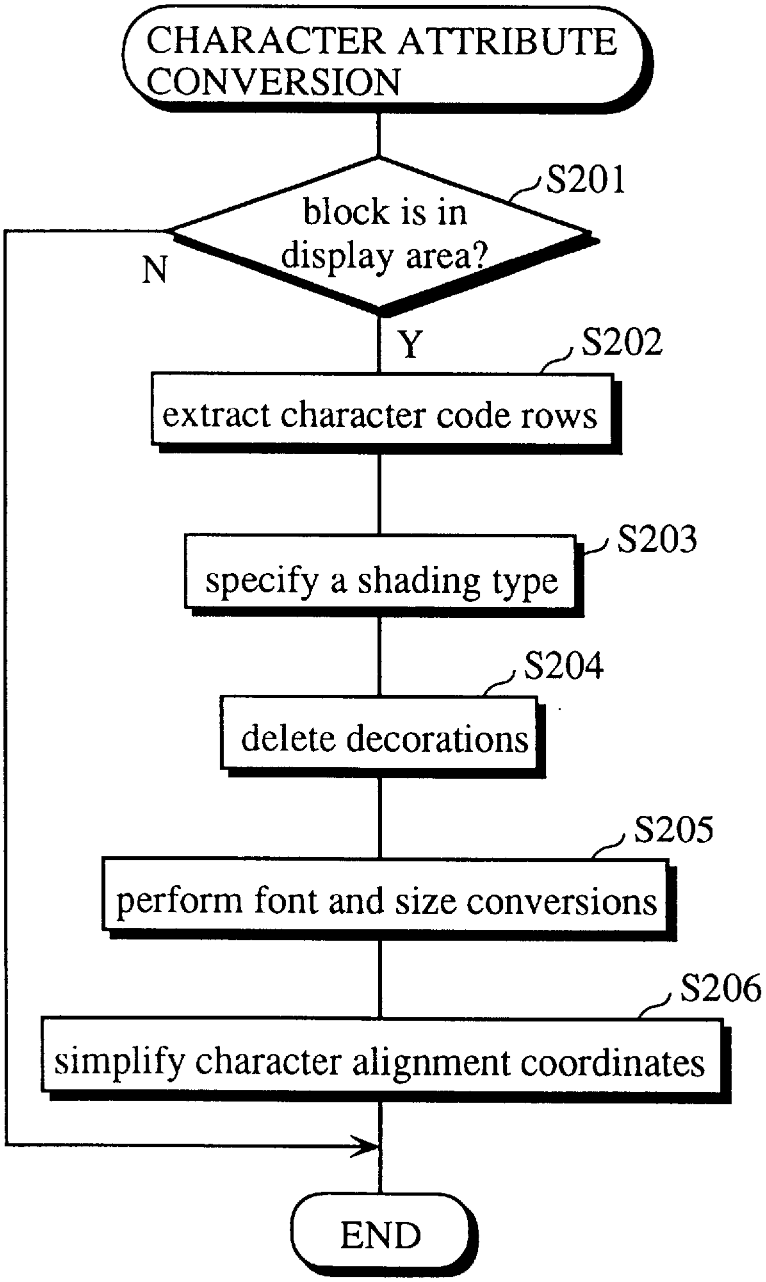
FIG. 12 is a flowchart of the character attribute conversion.
Figure 17A:
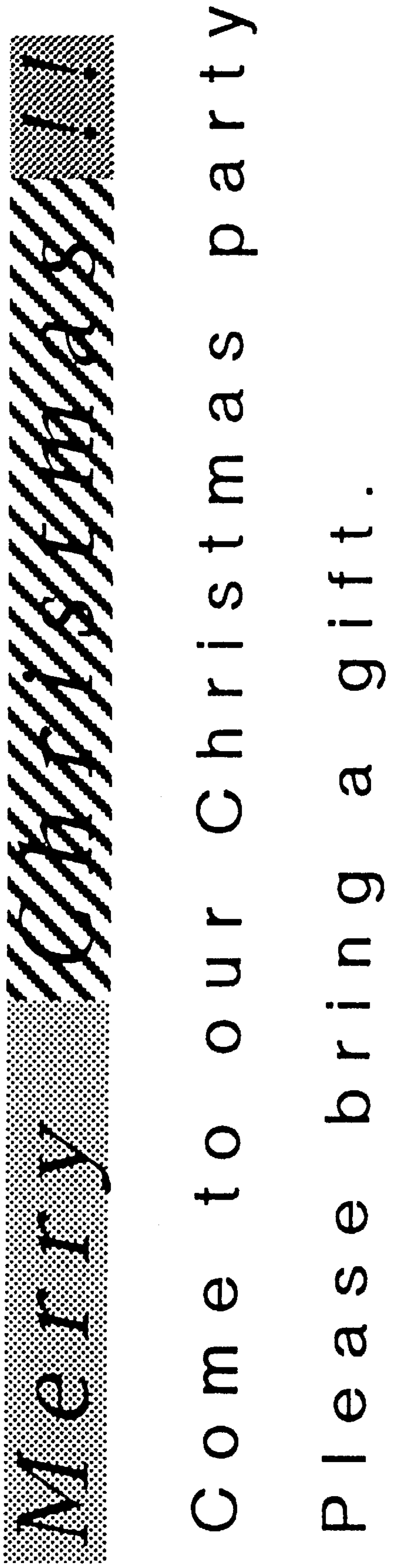

Now, the character attribute conversion is described with reference to the flowchart shown in FIG. 12. Character attribute converting unit 105 judges whether the fetched character row block is in the display area (step S201). If It is, character attribute converting unit 105 extracts character code row from the character row block (step S202), and specifies a shading type (step 5203). For example, "Merry Christmas!!" shown in FIG. 17A with three types of shading is converted to the one with one type of shading as shown in FIG. 17B. Then, character attribute converting unit 105 deletes decorations (step S204). For example, "Merry Christmas!!" of FIG. 17A slanted by the decoration is converted to the one as shown in FIG. 17B. That is, FIG. 17B uses the original font for the characters which have been slanted by software processing. Character attribute converting unit 105 performs font and size conversions (step S205). Specifically, the font is converted to Courier, and the size to 10×10 dots. For example, the first character row shown in FIG. 17A with 20×20 dots in size is converted to the one with 10×10 dots shown in FIG. 17B. Also, the second and third character rows shown in FIG. 17A with sans serif font is converted to those with Courier font shown in FIG. 17B. Character attribute converting unit 105 simplifies character alignment coordinates (step S206). Specifically, character attribute converting unit 105 specifies "0 dot" for space between characters, and "2 dots" for space between lines. For example, the first to third character rows shown in FIG. 17A are converted to those shown in FIG. 17B with 0-dot space between characters and 2-dot space between lines. Also, character attribute converting unit 105 deletes two low-order bits from the start position information of character rows then calculates the coordinates (step S206). The data of the converted character row block is stored in a certain storage area. The character attribute conversion ends.

Figure 9:
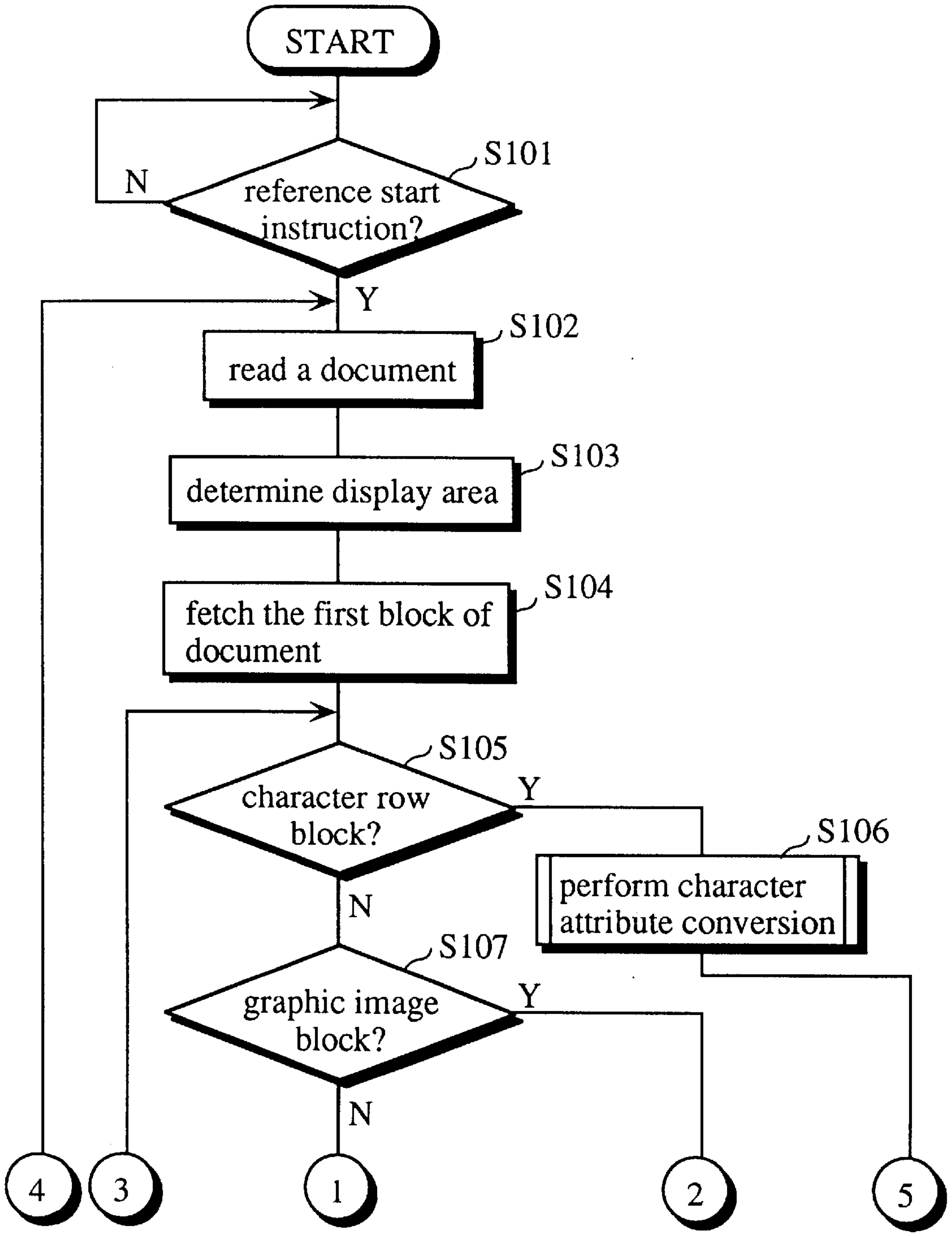
FIG. 9 is a flowchart of data conversion controlling unit 104.
Figure 10:
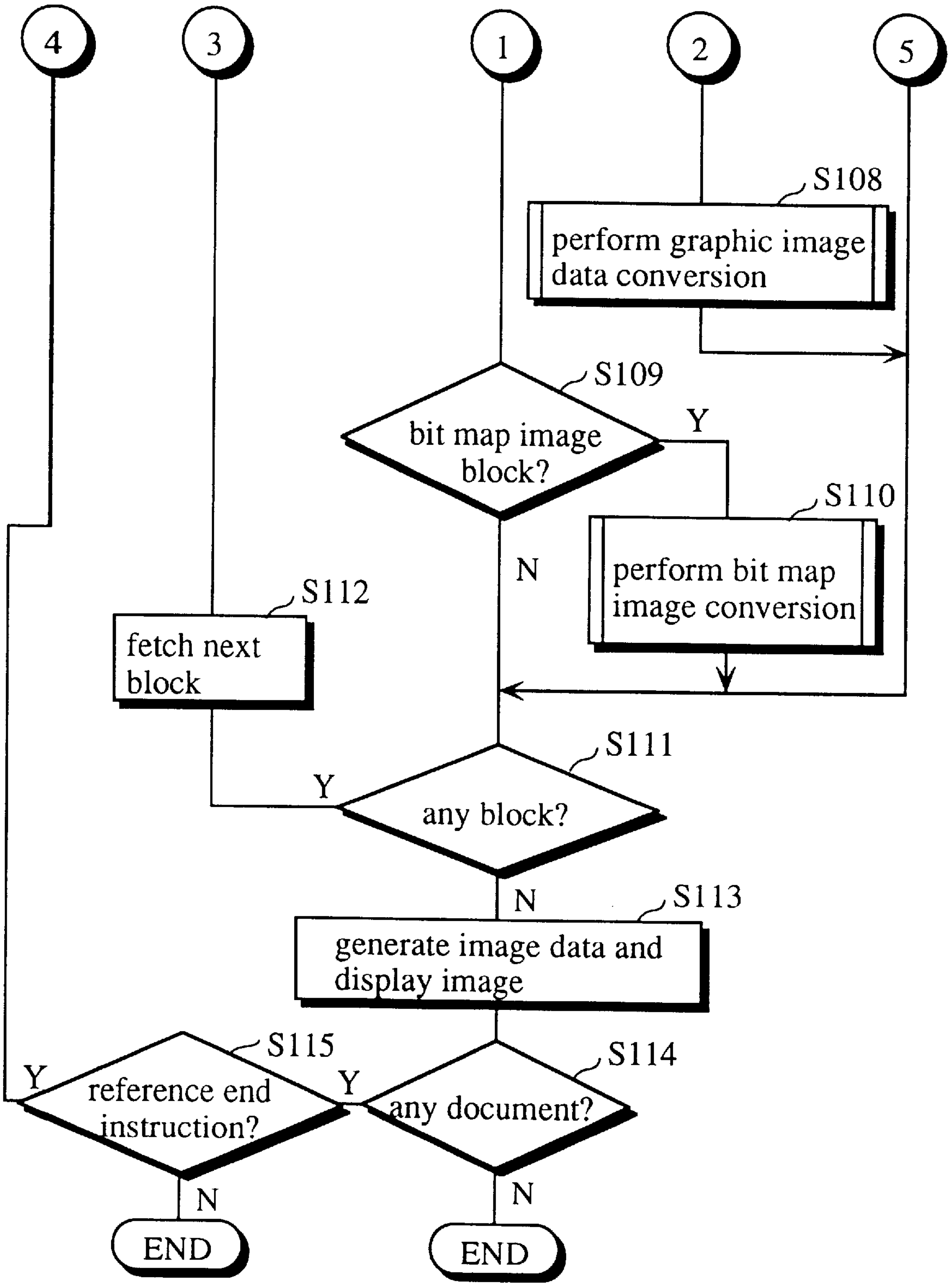
FIG. 10 is a flowchart continued from the flowchart of FIG. 9.

Going back to FIGS. 9 and 10, date conversion controlling unit 104 judges whether there is any block (step S111). If there is, data conversion controlling unit 104 fetches the block (step S112). Data conversion controlling unit 104 judges whether the fetched block is a character row block (step S105). If not, data conversion controlling unit 104 judges whether the fetched block is a graphic image block (step 5107). If it is, graphic image attribute converting unit 106 performs the graphic image data conversion (step S108).

Figure 14:
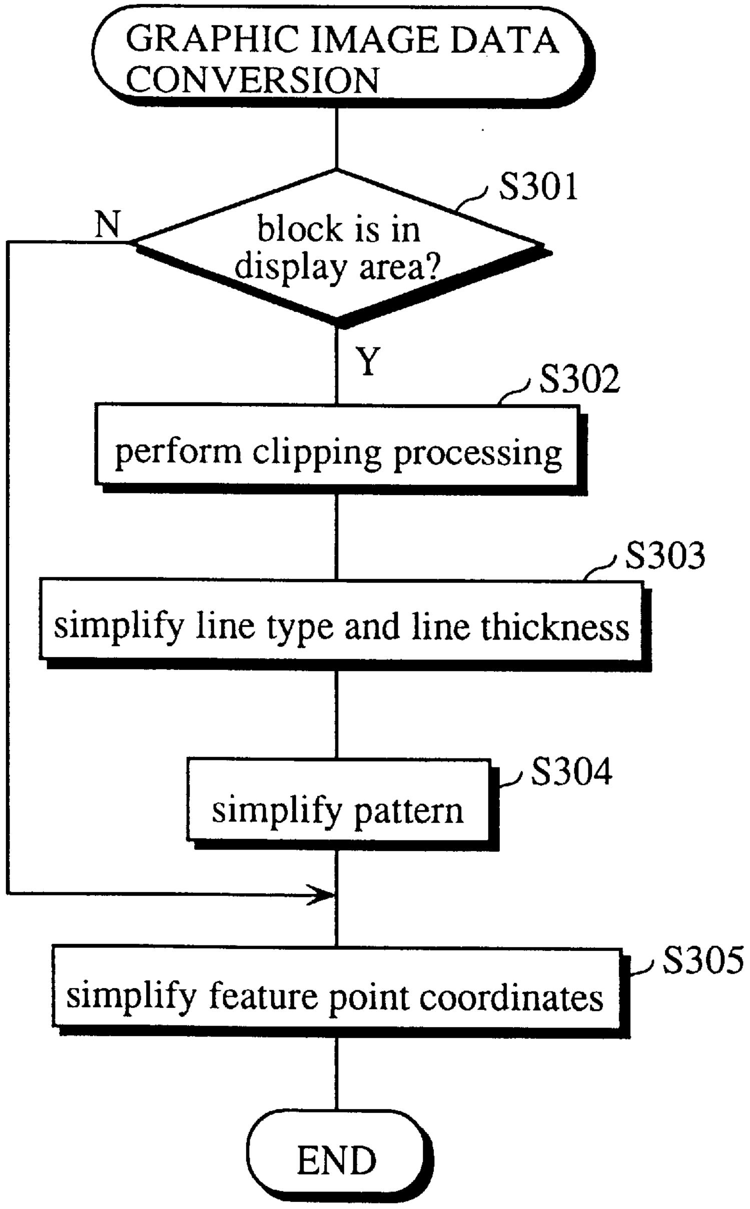
FIG. 14 is a flowchart of the graphic image attribute conversion.

Now, the graphic image data conversion is described with reference to the flowchart of FIG. 14. Graphic image attribute converting unit 106 judges whether the fetched graphic image block is in the display area (step S301). If it is, graphic image attribute converting unit 106 performs the clipping proceeding (step S302). In the clipping processing, if a part of the graphic image is out of the display area, the part is deleted. Graphic image attribute converting unit 106 simplifies the line type and line thickness (step S303). Specifically, graphic image attribute converting unit 106 specifies a solid line for line type, and "1 dot" for line thickness. Graphic image attribute converting unit 106 simplifies the pattern (step S304). Specifically, "white" is converted to "no pattern," "no pattern," "black," or "shading" remains to be the same, and others are converted to "shading." For example, the graphic images shown in FIG. 18A with shading and other patterns are converted to those shown in FIG. 18B with solid lines and shading.

Figure 18A:
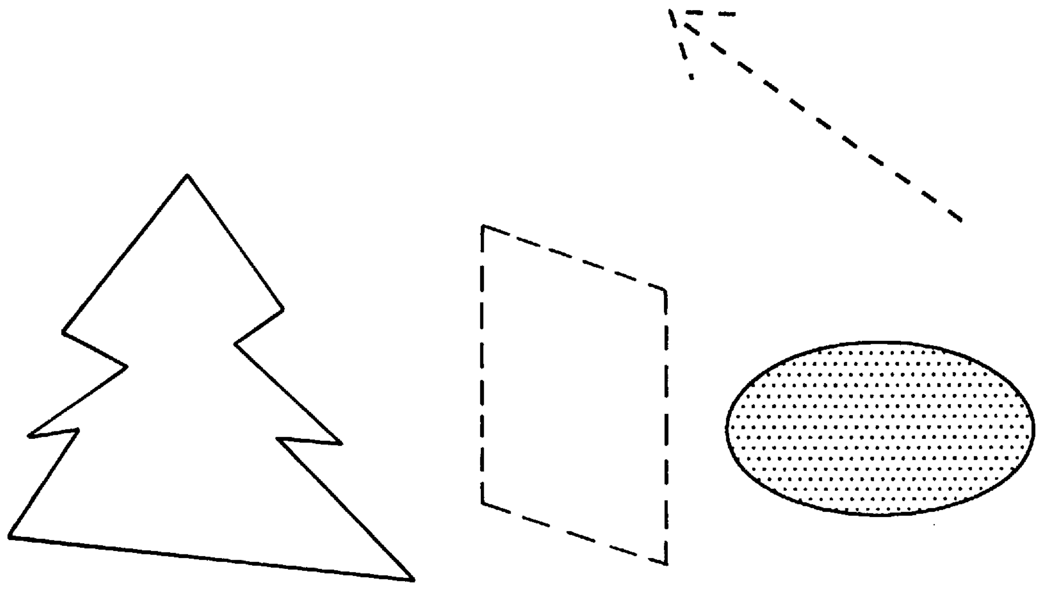
FIGS. 18A and 18B show how graphic images are converted.
Figure 18B:
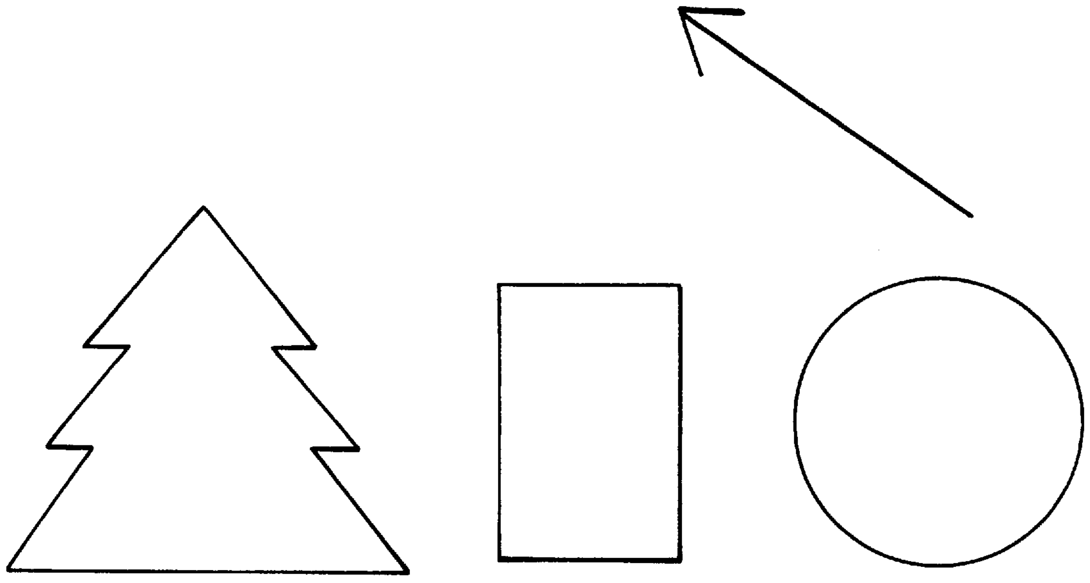

Graphic image attribute converting unit 106 simplifies the feature point coordinates (step S305). Specifically, graphic image attribute converting unit 106 deletes two low-order bits from feature point coordinate information. For example, 10-bit feature point coordinate information is converted to 8-bit feature point coordinate information. This reduces the size of calculations. Graphic image attribute converting unit 106 calculates the coordinates using the reduced feature point coordinate information. The obtained coordinates may be different from those obtained with the original feature point coordinate information. For example, the graphic images shown in FIG. 18A may be converted to those shown in FIG. 18B. Note that the images in FIG. 18B show rare conversions since they are all symmetric. For example, a parallelogram in FIG. 18A is converted to a rectangle in FIG. 18B. The data of the converted graphic image block is stored in a certain storage area. The graphic image data conversion ends.

Going back to FIGS. 9 and 10 again, data conversion controlling unit 104 judges whether there is any block (step S111). If there is, data conversion controlling unit 104 is fetches the block (step S112). Data conversion controlling unit 104 judges whether the fetched block is a character row block (step S105). If not, data conversion controlling unit 104 judges whether the fetched block is a graphic image block (step S107). If not, data conversion controlling unit 104 judges whether the fetched block is a bit map image block (step S109). If it is, bit map image converting unit 107 performs the bit map image conversion (step S110).

Figure 15:
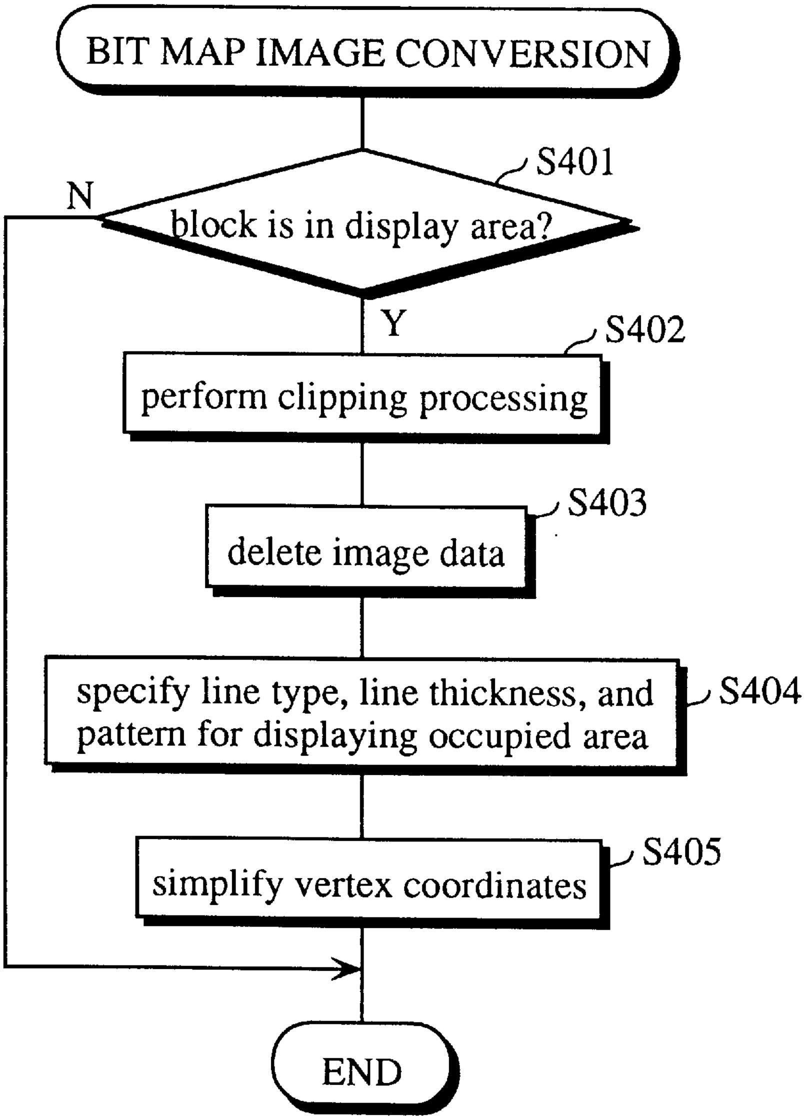
FIG. 15 is a flowchart of the bit map image conversion.

Now, the bit map image conversion is described with reference to the flowchart of FIG. 15. Bit map image converting unit 107 judges whether the fetched bit mop image block is in the display area (step S401). If it is, bit map image converting unit 107 performs the clipping processing (step S402), then deletes image date 61 (step S403). If image data 61 is an independent file, this step is not performed. Bit map image converting unit 107 specifies a line type, a line thickness, and a pattern for occupied area 62 (step S404). For example, the bit map image shown in FIG. 16A is converted to the one as shown in FIG. 16B by the specifications in occupied area 62. Then, bit map image converting unit 107 simplifies the coordinates of the area (step S405). Specifically, bit map image converting unit 107 deletes two low-order bits from occupied area 62, then calculates the coordinates. The date of the converted bit map image block is stored in a certain storage area. The bit map image conversion ends.

Figure 19A:
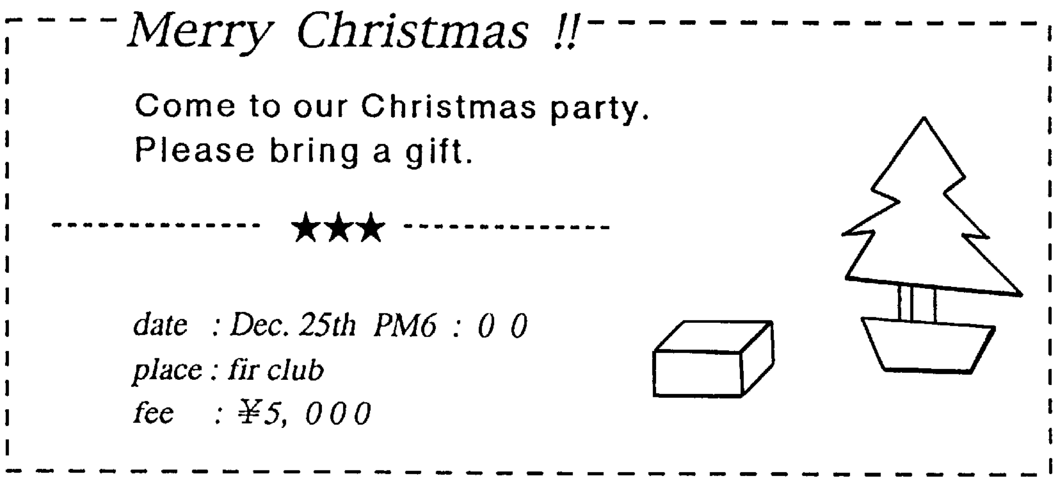
FIGS. 19A and 19B shows how a document page is converted.
Figure 19B:
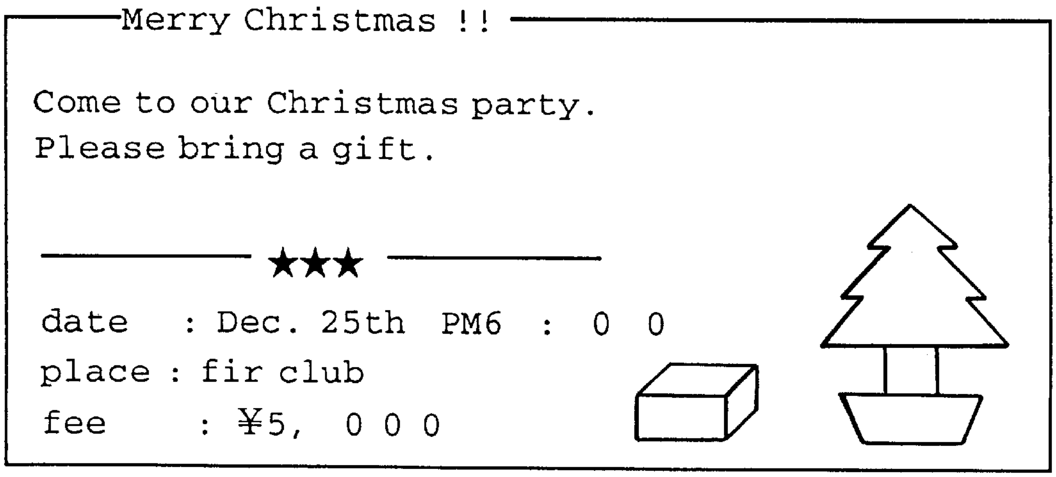

Going back to FIGS. 9 and 10 again, data conversion controlling unit 104 judges whether there is any block (step S111). If not, image generating unit 109 generates the display image of a page of a document based on the data of the converted blocks stored in certain storage areas, and displaying unit 110 displays an image on the screen based on the display image data (step S113). When image generating unit 109 generates the display image data, the deleted two lower-order bits are restored. Data conversion controlling unit 104 judges whether there is any document (step S114). If there is, data conversion controlling unit 104 judges whether the operator has entered a reference end instruction (step S115). If not, the next document is read, and steps S102 to S115 are repeated. The document reference processing ends if it is judged that there is not any document at step S114 or if it is judged that the operator has not entered a reference end instruction at step S115. As a result, a page of a document is displayed as shown in FIG. 19B converted from the one shown in FIG. 19A.

In this Embodiment, steps S105 to S110 are processed for each block in the document supposing that various types of blocks are included in the document at random. However, these steps for the conversion may be performed for each type with all the blocks. For example, first all character row blocks are extracted and converted, secondly the same for graphic image blocks, and lastly the same for bit map image blocks.

In this Embodiment, character display positions are specified by spaces between characters and spaces between lines. However, coordinates may be calculated in units of four dots instead of one dot. Specifically, two lower-order bits are deleted from the character display position information when coordinates are calculated. This reduces the time for calculating the coordinates.

In this Embodiment, character attribute converting unit 105 and graphic image attribute converting unit 106 hold the tables for conversion. However, the operator may specify the attributes each time the operator activates the document reference apparatus. For example, the operator may specify two types of character sizes when various character sizes are used in the document. Then, the operator will effectively search the document.

The same image such as a rectangle with a certain size may be displayed replacing a bit map image regardless of the size or hope of the occupied area of the bit map image. This reduces the time for getting the size of the occupied area when image data 61 is stored in an independent file, when the information of the size and shape of the occupied area is stored in the independent file, and when the document data includes only information of display position.

The information of the bit map image such as the ID or the file number may be displayed with the image displayed at the place where a bit map image is to be displayed.

In this Embodiment, the contents of the conversion by bit map image converting unit 107 is predetermined. However, the operator may set the contents each time the operator activates the document reference apparatus.

A part of or none of character attribute converting unit 105, graphic image attribute converting unit 106, bit map image converting unit 107, and relative position converting unit 108 may be set to be activated. When such arrangement is set, image generating unit 109 generates the image data based on the document data read by reading unit 103. The setting may be held by data conversion controlling unit 104, or set by the operator at each activation of the document reference apparatus.

The processing by character attribute converting unit 105, graphic image attribute converting unit 106, bit map image converting unit 107, and relative position converting unit 108 may be performed only when the number of target documents exceeds a threshold value.

The execution order of character attribute converting unit 105, graphic image attribute converting unit 106, bit map image converting unit 107, and relative position converting unit 108 may be changed.

As apparent from the above description, the present invention in First Embodiment realizes a high-speed page-by-page image display since the size of the processing for generating the display images is reduced by simplifying and unifying character attribute information 22, while character codes remain due to their importance in searching for a desired document. This is most clear when any decorations (slant, outline, rotate, etc.) are specified in character attribute information 22 since a decoration requires software processing against the original font and takes a lot of time.

The present invention in First Embodiment realizes a high-speed page-by-page image display and improves the document reference efficiency by reducing the amount of feature point coordinate information, which has a large effect in the document reference. The simplifying and unifying of graphic image attribute information 42 helps reduce the size of the processing for generating display images.

The present invention in First Embodiment realizes a high-speed page-by-page image display and improves the document reference efficiency by simplifying the calculation of display positions of characters, graphic images, and bit map images.

<Second Embodiment>

Figure 20:
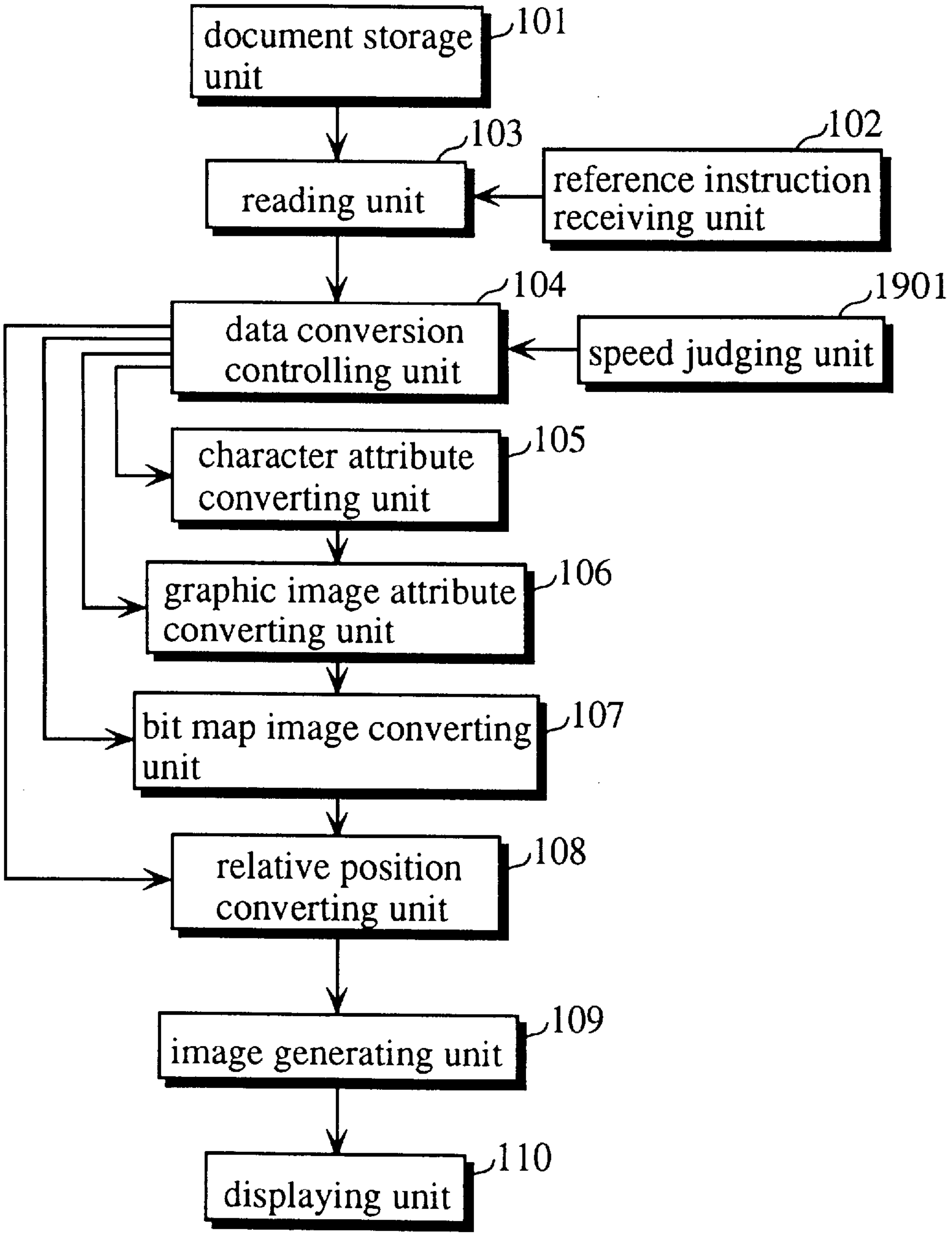
FIG. 20 is a block diagram showing the construction of the document reference apparatus of the present invention in Second Embodiment.

FIG. 20 Is a block diagram showing the construction of the document reference apparatus in Second Embodiment of the present invention. The document reference apparatus comprises document storage unit 101, reference instruction receiving unit 102, reading unit 103, data conversion controlling unit 104, character attribute converting unit 105, graphic image attribute converting unit 106, bit map image converting unit 107, relative position converting unit 108, image generating unit 109, displaying unit 110, and speed judging unit 1901. The same components as those in First Embodiment are not explained here.

Speed judging unit 1901 judges whether the speed of page display specified by the operator is greater than a certain standard value. The speed of page display is the speed taken for displaying the document on the screen page by page in sequence. If speed judging unit 1901 Judges that the speed to greater then the standard value, speed judging unit 1901 directs data conversion controlling unit 104 to activate character attribute converting unit 105, graphic image attribute converting unit 106, bit map image converting unit 107, and relative position converting unit 108. If speed judging unit 1901 judges that the speed is not greater than the standard value, speed judging unit 1901 directs data conversion controlling unit 104 not to activate the units.

Speed judging unit 1901 may detect a range of standard values to which the speed of page display belongs, then select a process to be executed.

The operator may set the standard value used by speed judging unit 1901 each time the operator activates the document reference apparatus.

The processes to be executed according to the standard values may be held by data conversion controlling unit 104, or the operator may set the processes each time the operator activates the document reference apparatus.

The processing by character attribute converting unit 105, graphic image attribute converting unit 106, bit map image converting unit 107, and relative position converting unit 105 may be activated only when the number of target documents exceeds a threshold value.

The execution order of character attribute converting unit 105, graphic image attribute converting unit 106, bit map image converting unit 107, and relative position converting unit 108 may be changed.

As apparent from the above description, the present invention in Second Embodiment realizes a high-speed page-by-page image display and improves the document reference efficiency since the apparatus decreases the time taken for generating graphic images when the operator specifies a page display speed greater than a standard value.

<Third Embodiment>

Figure 21:
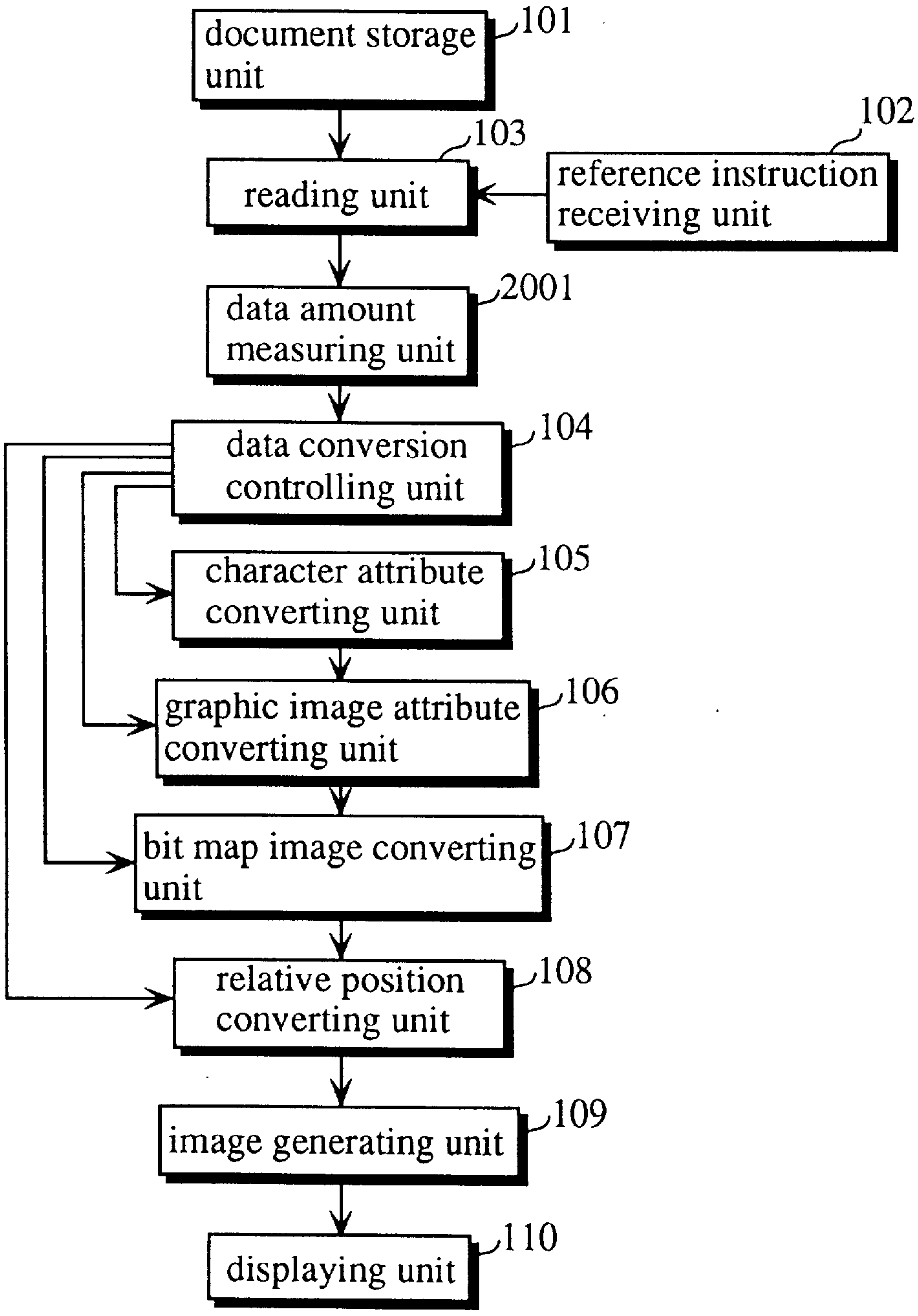
FIG. 21 is a block diagram showing the construction of the document reference apparatus of the present invention in Third Embodiment.

FIG. 21 is a block diagram showing the construction of the document reference apparatus in Third Embodiment of the present invention. The document reference apparatus comprises document storage unit 101, reference instruction receiving unit 102, reading unit 103, data conversion controlling unit 104, character attribute converting unit 105, graphic image attribute converting unit 106, bit map image converting unit 107, relative position converting unit 108, image generating a unit 109, displaying unit 110, and data amount measuring unit 2001. The same components as those in First Embodiment are not explained here.

Data amount measuring unit 2001 measures the amount of document data read by reading unit 103, and judges whether the amount exceeds a certain standard value. If it exceeds, data amount measuring unit 2001 directs data conversion controlling unit 104 to activate character attribute converting unit 105, graphic image attribute converting unit 106, bit map image converting unit 107, and relative position converting unit 108. If it does not exceed, data amount measuring unit 2001 directs data conversion controlling unit 104 not to activate the units.

The operator may set the standard value used by data amount measuring unit 2001 each time the operator activates the document reference apparatus.

Data amount measuring unit 2001 may detect a range of standard values to which the speed of page display belongs, then select a process to be executed.

The processes to be executed by conversion controlling unit 104 may be held by data conversion controlling unit 104, or the operator may set the processes each time the operator activates the document reference apparatus.

The execution order of character attribute converting unit 105, graphic image attribute converting unit 106, bit map image converting unit 107, and relative position converting unit 108 may be changed.

As apparent from the above description, the present invention in Third Embodiment realizes a high-speed page-by-page image display and improves the document reference efficiency since the apparatus decreases the time taken for generating images when the document has a large amount of data.

<Others>

The present invention can be realized in a program. And the program can be stored in a storage medium such as a floppy disk. Such a storage medium is easy to carry around, and the program can be executed in another independent computer system by setting the medium.

Figure 22A:
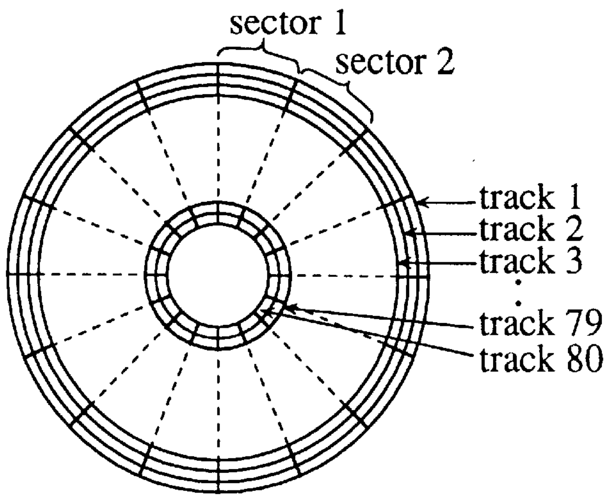
FIG. 22A shows a physical format of a main body of a floppy disk.

FIG. 22A shows a physical format of a main body of a floppy disk. Tracks of concentric circles are made from the periphery to a center. Each track is divided into 16 sectors. The program is recorded in units of sectors.

Figure 22B:
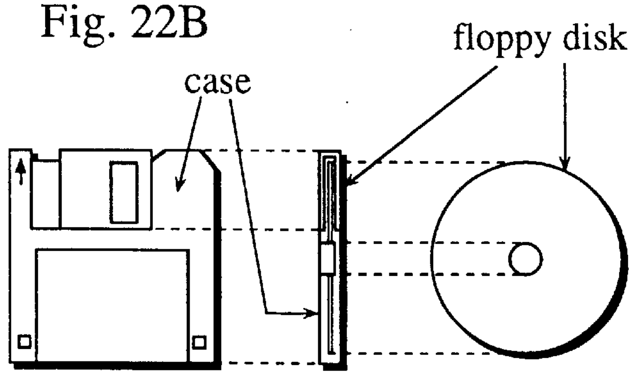
FIG. 22B shows a case of a floppy disk.

FIG. 22B shown a case of a floppy disk from left to right; a front view of the case, a sectional view of the case, and the floppy disk. The case protects the floppy disk from dusts or shooks, and enables a safe transfer.

Figure 22C:
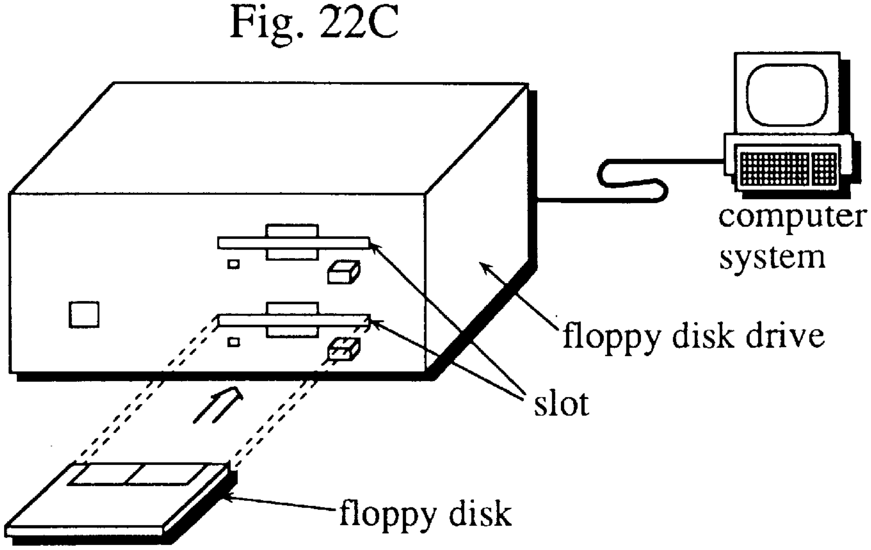
FIG. 22C shows how the program is written/read into/from a floppy disk.

FIG. 22C shows how the program is written/read into/from e floppy disk. A floppy disk is set in a computer system so that the program can be written onto the floppy disk or read from the floppy disk. The floppy disk is placed in or removed from a floppy dick drive through the slot. Then, the computer system is ready to write/read the program onto/from the floppy disk.

The program is also written/read into/from optical disks, IC cards, ROMs as well as floppy disks.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A document reference apparatus for displaying display images of documents at a high speed in a manner in which a user feels as if flicking through the documents, helping the user search for a desired document, the document reference apparatus comprising:

a document storage means for storing a plurality of documents which are to be referred to by the user, wherein each document is composed of one or more blocks, each block including one or more display attributes;

an instruction receiving means for receiving a reference start instruction, a reference end instruction, and a reference range instruction input by the user;

a reading means for sequentially reading documents which are in a range specified by the reference range instruction from the document storage means, wherein the reading means starts reading documents when the instruction receiving means receives the reference start instruction and ends reading documents when the instruction receiving means receives the reference end instruction;

a display attribute converting means for converting display attributes of the read documents into predetermined display attributes, wherein the predetermined display attributes enable the display images to be generated at a high speed;

an image generating means for generating display images of the read documents which include the predetermined display attributes; and a displaying means for sequentially displaying the generated display images.

2. The document reference apparatus of claims 1, wherein:

each of the plurality of documents stored in the document storage means includes one or more character row blocks which each are composed of characters, each character being composed of a character code and one or more character attributes being display attributes, wherein;

the reading means reads each document block by block, the document reference apparatus further comprising:

a data conversion controlling means for judging whether a read block is a character row block, wherein the display attribute converting means includes:

a character attribute storage unit for storing a list of predetermined character attributes, as predetermined display attributes, which correspond to all character attributes; and a character attribute converting unit for converting character attributes include in the read block to corresponding predetermined character attributes stored in the character attribute storage unit when the data conversion controlling means judges that the read block is a character row block.

3. The document reference apparatus of claim 2, wherein each character row block includes a plurality of fonts being character attributes, wherein the character attribute storage unit stores one predetermined font corresponding to the plurality of fonts.

4. The document reference apparatus of claim 1, wherein each of the plurality of documents stored in the document storage means includes display position attribute information which indicates display positions of document elements, wherein the display attribute converting means includes:

a relative position converting unit for deleting the display position attribute information from the read documents, wherein the image generating means generating display images of the read documents from which the display position attribute information has been deleted.

5. The document reference apparatus of claim 1, wherein each of the plurality of documents stored in the document storage means includes one or more graphic image blocks which each are composed of graphic images, each graphic image including one or more graphic image attributes and feature point coordinate information and both being display attributes, wherein the reading means reads each document block by block, the document reference apparatus further comprising:

a data conversion controlling means for judging whether a read block is a graphic image block, wherein the display attribute converting means includes:

a graphic image attribute storage unit for storing a list of predetermined graphic image attributes, as predetermined display attributes, which correspond to all graphic image attributes;

a graphic image attribute converting unit for converting graphic image attributes included in the read block to corresponding predetermined graphic image attributes stored in the graphic image attribute storage unit when the data conversion controlling means judges that thread block is a graphic image block;

a feature point coordinate deleting unit for rounding off the feature point coordinate information included in the read block.

6. The document reference apparatus of claim 5, wherein the feature point coordinate deleting unit deletes a certain number of low-order bits from the feature pint coordinate information included in the read block.

7. The document reference apparatus of claim 5, wherein each graphic image attribute includes a plurality of line types, wherein the graphic image attribute storage unit stores one predetermined line type corresponding to the plurality of line types.

8. The document reference apparatus of claim 1, wherein each of the plurality of documents stored in the document storage means includes one or more bit map image blocks which each are composed of a bit map image and occupied area information being display attributes, the occupied area information specifying an area occupied by the bit map image of its own in a document, and wherein the reading means reads each document block by block, the document reference apparatus further comprising:

a data conversion controlling means for judging whether a read block is a bit map image block, wherein the display attribute converting means includes:

an image replacing unit for replacing the bit map image of the read block by an outline of the area occupied by the bit map image.

9. A document reference apparatus for displaying display images of documents at a high speed in a manner in which a user feels as if flicking through the documents, helping the user search for a desired document, the document reference apparatus comprising:

a document storage means for storing a plurality of documents which are to be referred to by the user, wherein each document is composed of one or more blocks, each block including one or more display attributes;

an instruction receiving means for receiving a reference start instruction, a reference end instruction, a reference range instruction, and a display speed instruction input by the user;

a display speed judging means for judging whether a display speed specified in the display speed instruction received by the instruction receiving means exceed a predetermined speed;

a reading means for sequentially reading documents which are in a range specified by the reference range instruction from the document storage means, wherein the reading means starts reading documents when the instruction receiving means receives the reference start instruction and ends reading documents when the instruction receiving means receives the reference end instruction;

a display attribute converting means for converting display attributes of the read documents into predetermined display attributes when the display speed judging means judges that the display speed specified in the display speed instruction exceeds the predetermined speed, wherein the predetermined display attributes enable the display images to be generated at a high speed;

a first image generating means for generating display images of the read documents which include the predetermined display attributes;

a second image generating means for generating display images of the read documents when the display speed judging means judges that the display speed specified in the display speed instruction fails to exceed the predetermined speed; and a displaying means for sequentially displaying the display images generated by the first image generating means and the second image generating means.

10. A document reference apparatus for displaying display images of documents at a high speed in a manner in which a user feels as if flicking through the documents, helping the user search for a desired document, the document reference apparatus comprising:

a document storage means for storing a plurality of documents which are to be referred to by the user, wherein each document is composed of one or more blocks, each block including one or more display attributes;

an instruction receiving means for receiving a reference start instruction, a reference end instruction, a reference range instruction, and a display speed instruction input by the user;

a reading means for sequentially reading documents which are in a range specified by the reference range instruction from the document storage means, wherein the reading means starts reading documents when the instruction receiving means receives the reference start instruction and ends reading documents when the instruction receiving means receives the reference end instruction;

a data amount judging means for judging whether an amount of data of the documents read by the reading means exceeds a predetermined data amount;

a display attribute converting means for converting display attributes of the read documents into predetermined display attributes when the data amount judging means judges that the amount of data of the documents read by the reading means exceeds the predetermined data amount, wherein the predetermined display attributes enable the display images to be generated at a high speed;

a first image generating means for generating display images of the read documents which include the predetermined display attributes;

a second image generating means for generating display images of the read documents when the data amount judging means judges that the amount of data of the documents read by the reading means fails to exceed the predetermined data amount; and a displaying means for sequentially displaying the display images generated by the first image generating means and the second image generating means.

11. A document reference method for displaying display images of documents at a high speed in a manner in which a user feels as if flicking through the documents, helping the user search for a desired document, the document reference method comprising:

an instruction receiving step for receiving a reference start instruction and a reference range instruction input by the user;

a reading step for sequentially reading documents which are in a range specified by the reference range instruction from a document storage unit, wherein the document storage unit stores a plurality of documents which are to be referred to by the user, wherein each document is composed of one or more blocks, each block including one or more display attributes;

a display attribute converting step for converting display attributes of the read documents into predetermined display attributes, wherein the predetermined display attributes enable the display images to be generated at a high speed;

an image generating step for generating display images of the read documents which include the predetermined display attributes;

a displaying step for sequentially displaying the generated display images; and a reference end instruction receiving step for receiving a reference end instruction input by the user, and allowing the reading documents to be ended in the reading step when receiving the reference end instruction.

12. A recording medium recording a computer-readable program which achieves a document reference apparatus for displaying display images of document at a high speed in a manner in which a user feels as if flicking through the documents, helping the user search for a desired document, the computer-readable program comprising:

an instruction receiving step for receiving a reference start instruction and a reference range instruction input by the user;

a reading step for sequentially reading documents which are in a range specified by the reference range instruction from a document storage unit, wherein the document storage unit stores a plurality of documents which are to be referred to by the user, wherein each document is composed of one or more blocks, each block including one or more display attributes;

a display attribute converting step for converting display attributes of the read documents into predetermined display attributes, wherein the predetermined display attributes enable the display images to be generated at a high speed;

an image generating step for generating display images of the read documents which include the predetermined display attributes;

a displaying step for sequentially displaying the generated display images; and a reference end instruction receiving step for receiving a reference end instruction input by the user, and allowing the reading documents to be ended in the reading step when receiving the reference end instruction.

13. A document reference apparatus for electronically displaying images of documents at high speed to help the user search for a desired document, the document reference apparatus comprising:

a document storage means for storing a plurality of documents which are to be referred to by the user, wherein each document includes one or more first display attributes;

an instruction receiving means for receiving a reference start instruction, a reference end instruction, and a reference range instruction input by the user;

a reading means for sequentially reading documents which are in a range specified by the reference range instruction from the document storage means, wherein the reading means starts reading documents when the instruction receiving means receives the reference start instruction and ends reading documents when the instruction receiving means receives the reference end instruction;

a display attribute converting means for converting the first display attributes of the read documents into predetermined second display attributes of a different format than the respective first display attributes, wherein the predetermined second display attributes enable the display images to be generated at a higher speed than the first display attributes would permit;

an image generating means for generating display images of the read documents which include the predetermined display attributes; and a displaying means for sequentially displaying the generated display images.

* * * * *